(No Model.)

S. W. PAINE, H. A. GRAY & C. E. PETTEE.
LASTING MACHINE.

No. 387,366.

Patented Aug. 7, 1888.

Fig. 1.

Witnesses.
James F. DuHamel
Arthur Ashley

Inventors:
Seth W. Paine,
Hiram A. Gray,
Charles E. Pettee,
by Dodge Sons,
their Attys.

(No Model.) 6 Sheets—Sheet 2.

S. W. PAINE, H. A. GRAY & C. E. PETTEE.
LASTING MACHINE.

No. 387,366. Patented Aug. 7, 1888.

Fig. 2.

Witnesses:
James F. DuHamel
Arthur Ashley

Inventors:
Seth W. Paine,
Hiram A. Gray,
Charles E. Pettee,
by Dodge & Sons,
their Attys.

(No Model.) 6 Sheets—Sheet 3.

S. W. PAINE, H. A. GRAY & C. E. PETTEE.
LASTING MACHINE.

No. 387,366. Patented Aug. 7, 1888.

Fig. 3.

Witnesses:
James F. DuHamel
Arthur Ashley

Inventors:
Seth W. Paine,
Hiram A. Gray,
Charles E. Pettee, by Dodge & Sons,
their Attys.

(No Model.) 6 Sheets—Sheet 4.
S. W. PAINE, H. A. GRAY & C. E. PETTEE.
LASTING MACHINE.

No. 387,366. Patented Aug. 7, 1888.

Fig. 4.

Witnesses,
James F. DuHamel
Arthur Ashley

Inventors:
Seth W. Paine,
Hiram A. Gray,
Charles E. Pettee,
by Dodge Sons,
their Attys.

(No Model.) 6 Sheets—Sheet 6.

S. W. PAINE, H. A. GRAY & C. E. PETTEE.
LASTING MACHINE.

No. 387,366. Patented Aug. 7, 1888.

Witnesses:
James F. DuHamel
Arthur Ashley.

Inventors:
Seth W. Paine,
Hiram A. Gray,
Charles E. Pettee
by Dodge & Sons,
their Attys.

UNITED STATES PATENT OFFICE.

SETH WHITE PAINE, OF ROCHESTER, NEW YORK, HIRAM A. GRAY, OF NEW HAVEN, CONNECTICUT, AND CHARLES E. PETTEE, OF ILION, NEW YORK, ASSIGNORS TO WILLIAM S. KING, OF MINNEAPOLIS, MINNESOTA.

LASTING-MACHINE.

SPECIFICATION forming part of Letters Patent No. 387,366, dated August 7, 1888.

Application filed November 12, 1887. Serial No. 254,997. (No model.)

*To all whom it may concern:*

Be it known that we, SETH WHITE PAINE, of Rochester, in the county of Monroe and State of New York, HIRAM A. GRAY, of New Haven, in the county of New Haven and State of Connecticut, and CHARLES E. PETTEE, of Ilion, in the county of Herkimer and State of New York, have invented certain new and useful Improvements in Lasting-Machines, of which the following is a specification.

Our invention relates to machines for lasting shoes, and is in the nature of an improvement or perfection of inventions for which Letters Patent were granted to Seth W. Paine and Edgar S. Combs, bearing date the 11th day of January, 1887, and numbered, respectively, 355,874, 355,875, and 355,876.

The various features of invention will be explained in the following description and set forth in the claims, reference being had in the description to the annexed drawings, in which—

The machine is designed to first draw the upper lengthwise of the last toward or over the toe and laterally, then to draw the sides past the insole, and, lastly, while the upper is still under strain of the stretching mechanism, to fold or press the edges of the upper smoothly and evenly over and upon the insole, to which it is secured in any convenient manner, a suitable cement being preferably employed for the purpose.

With this plan of operation in view, we construct the machine as shown in the drawings, wherein A indicates a metallic frame supported by legs B, and comprising a horizontal bed portion, A', an upright back plate, $A^2$, an overarching arm, $A^3$, and a vertical post or standard, $A^4$, which latter serves to sustain the forward end of arm $A^3$, and also forms a pivotal support about which the pincher-carrying frame C may swing in carrying the pinchers into or out of working position.

The vertical back plate, $A^2$, of the main frame carries the last-supports, the heel, toe, and side wipers or folders and their supports, and the operating mechanism of such wipers or folders. The overarching arm $A^3$ carries the controlling and actuating mechanism of the toe-pinchers, and the side pinchers with their controlling and actuating mechanisms are carried by the frame C, which, as above mentioned, is swiveled upon and swings in a horizontal plane about the upright post or standard $A^4$.

It is necessary, in order to adapt the machine for use with lasts of different forms and dimensions, that provision be made for adjusting the toe and heel supports to the several supports of the wipers or folders and their operating mechanism independently of each other; and to this end we mount said supports upon blocks D, E, F, and G, each having a dovetail tongue or back to fit and travel within a groove of like form between ribs or ways $a$, formed upon or secured to the upright back plate, $A^2$, as plainly shown in Figs. 1, 2, 3, and 4. For the purpose of moving these blocks and holding them at any desired adjustment, we provide for each a screw, H, furnished with a hand-wheel, H', and swiveled in a bracket, $b$, projecting from the back plate, $A^2$, the threaded stem of each screw being extended into a correspondingly-threaded hole or socket formed in the block which it controls.

Figure 1:
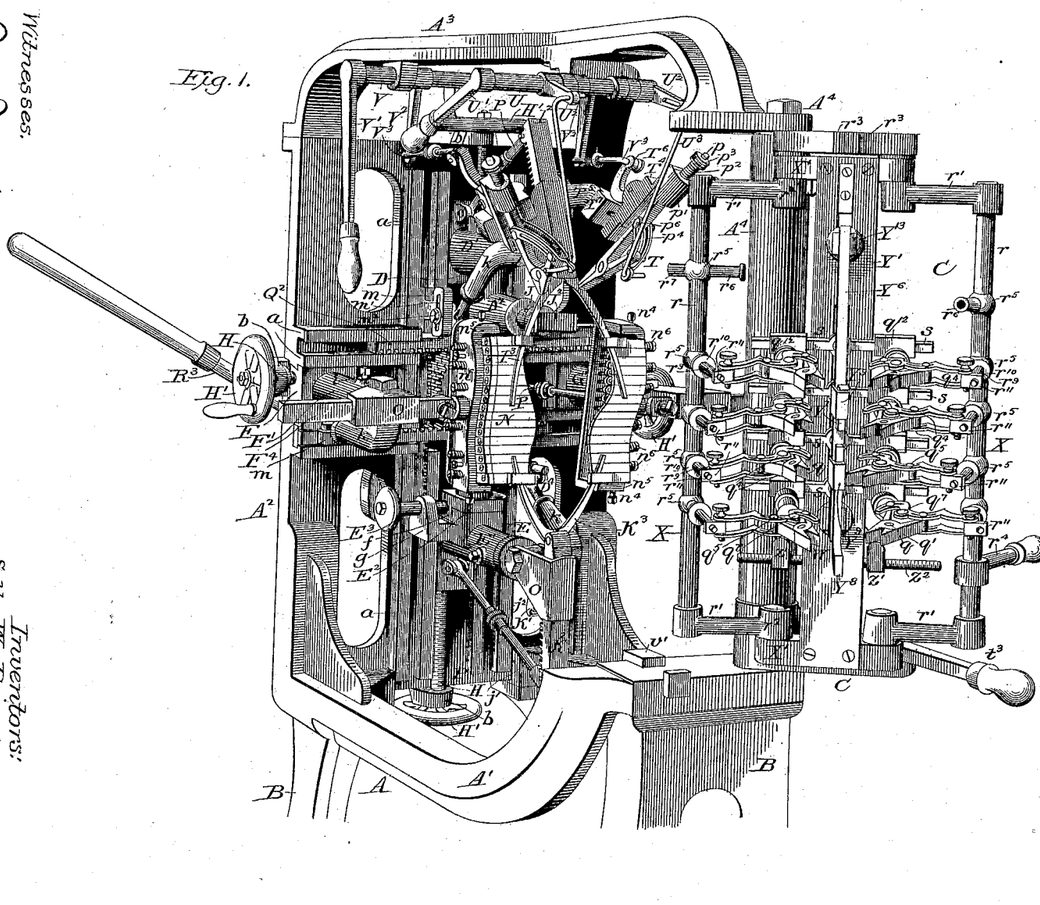
Figure 1 is a perspective view of our improved machine, showing the pincher-carrying frame swung away from the last.
Figure 2:
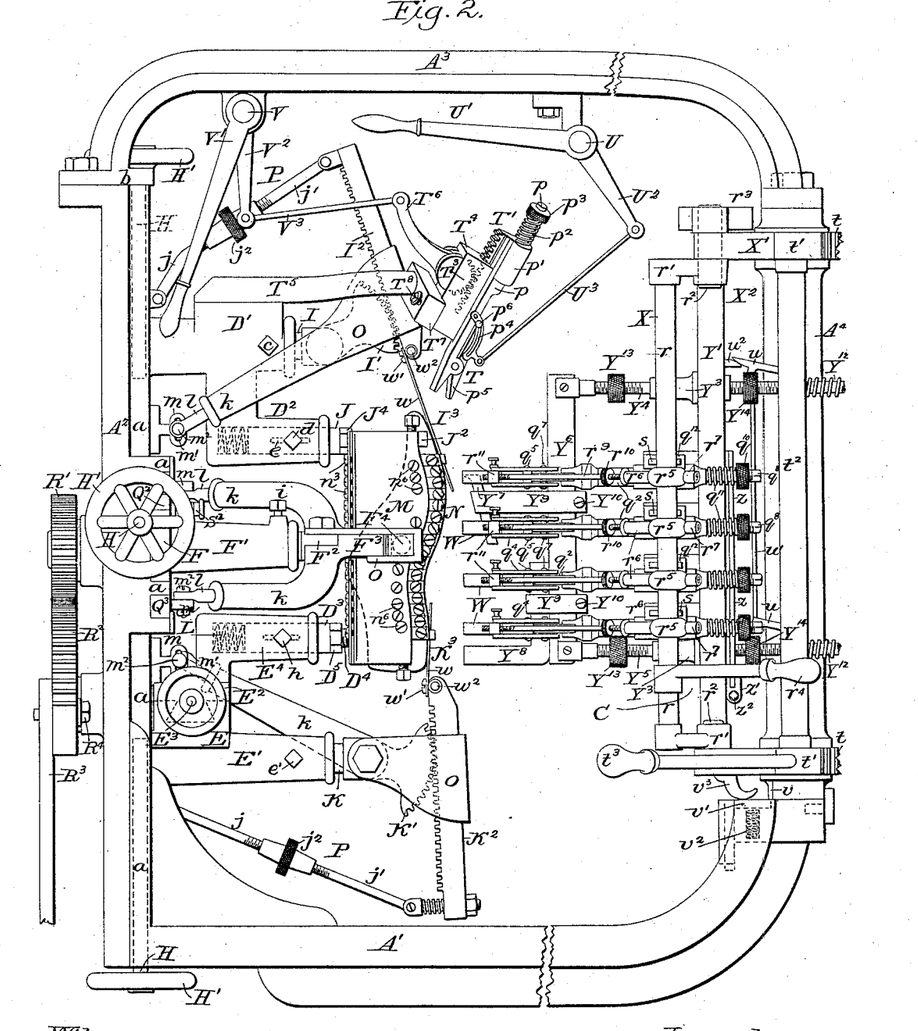
Fig. 2, a side elevation of the machine.

Block D carries a tubular post or standard, D', from which branches a secondary post, $D^2$, also of tubular form. The post D' is designed to receive and support a tubular stem, I, upon which is pivoted a toothed sector, I', by which sector motion is given to a rack-bar, I², carrying the toe wiper or folder I³, and the post D² is designed to receive and support a stem, J J', which carries at its outer end a toe-rest, J², in the form of a grooved block or saddle, as best shown in Figs. 1 and 2.

Figure 10:
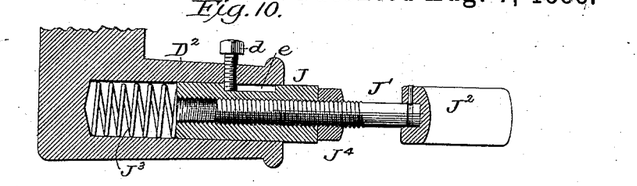

The stem I is accurately fitted to the bore of post D' and is adjustable longitudinally therein, so that the sector I', the rack-bar I², and the toe wipers or folders may be brought to proper positions relative to the sole of the last or to the insole thereon. A set-screw, c, serves to hold the stem I at any desired adjustment. The stem J is likewise accurately fitted to the bore of secondary post D² and bears at its inner end upon a coiled spring, J³, placed within the post, the spring tending to press the stem outward, but permitting it to be forced inward whenever subjected to pressure greater than the resistance of the spring. The play is limited by means of screw or stud d, passing through the side of the post and entering a slot or groove, e, in the stem, as shown in Figs. 1, 2, and 10. Under this arrangement the resistance of the spring and the play of the stem will remain constant; but as it is desirable to provide for positive adjustment of the toe support or block J², the stem is made in two parts, J J', one arranged to screw into the other, as shown in Fig. 10. By screwing the section J' more or less into section J, the projection of the former, and consequently the position of toe-rest J², may be varied, as desired, a jam-nut, J⁴, preventing the accidental turning of section J'.

The post D² is represented as formed integral with post D'; but in some cases it may be desirable to make it separate and to so attach it to post D' or block D that it may be laterally adjusted, as is done in the case of the heel-support, as will now be explained.

From block E there rises or projects a tubular post or column, E', into which is carefully fitted a stem, K, to which is pivoted a toothed sector, K', which meshes with and gives motion to a toothed rack-bar, K², carrying the heel wipers or folders K³. The stem K is longitudinally adjustable within post E', and is held at the desired adjustment by a set-screw, e', the arrangement being in all respects similar to that of the post D' and the parts sustained thereby.

The upper face of block E is formed with a dovetail groove, into which is nicely fitted a rib or tongue, f, formed upon the rear face of a plate or block, E², which is tapped to receive a screw-stem, E³, swiveled in an arm or bracket, g, projecting from block E. The screw E³ is furnished with a hand-wheel, by which it may be turned to move plate E² forward or backward across block E. From plate E² a post or standard, E⁴, projects to about the same distance as post D² of block D, and it is furnished, like said post D², with an internal coiled spring, L, and a longitudinally-movable stem, D³ D⁴, bearing at its inner end upon said spring. The section D⁴ of the stem is arranged to screw into section D³, in order to vary the projection of the stem beyond the post, a jam-nut, D⁵, preventing accidental variation, and the play of the stem as a whole is limited by a screw or pin, h, passing through post D² and entering a slot in the stem D³, as shown in Fig. 2.

As above intimated, post D² may be made separate from block D and provided with an adjusting-screw for lateral adjustment in the same manner as post E⁴.

Blocks F and G are respectively furnished with posts F' and G', bored to receive stems F² and G², to which are pivoted toothed sectors F³ and G³, which respectively give motion to toothed rack-bars F⁴ and G⁴, carrying the side jaws, M, the fingers or wipers N of which fold the upper over upon the insole at the sides of the last. The stems F² and G² are adjustable within their supporting-posts in the same manner as the stems I and K, and are held wherever adjusted by set-screws i.

Each of the four rack-bars I², K², F⁴, and G⁴ is held in engagement with its actuating-sector by means of a retaining cap or guard, O, pivoted concentrically with said sectors, and consequently free to tip or change their position to correspond with the movements of the rack-bars. The rack-bars, in order to give proper motion and action to the wipers which they support and carry, require a combined longitudinal and rocking or curvilinear motion, in order that the wipers or folders may follow closely the contour of the last, (indicated by dotted lines in Fig. 2,) and this we effect by supporting one end of each rack-bar upon a pivoted or swinging link, P, as shown in Figs. 1, 2, and 3.

Figure 3:
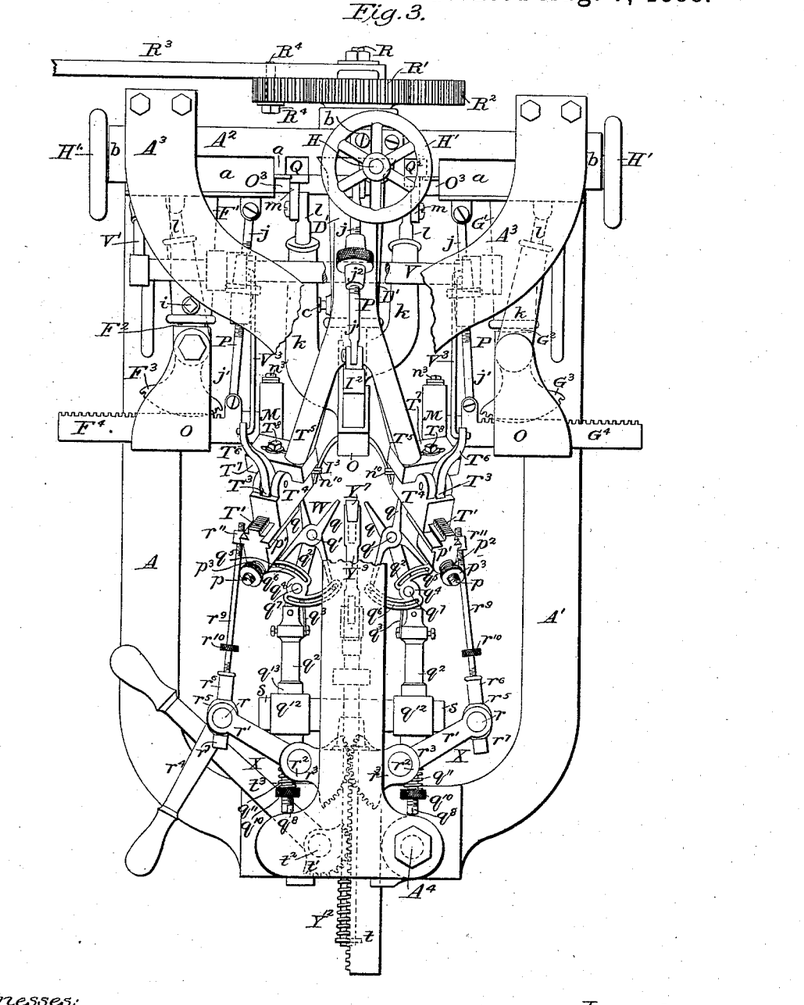
Fig. 3, a top plan view of the same with the overarching frame partially broken away.

The links of the rack-bars I² and K² are connected therewith at their outer or rear ends, as shown in Figs. 1, 2, and 3, while the links P of the rack-bars F⁴ and G⁴ are pivotally connected with the inner ends of said bars, as shown in Fig. 3, this difference being merely a matter of convenience, and not affecting the action of the rack-bars.

In order to vary the inclination and lines of movement of the several rack-bars, each link P is made in two parts, $j$ and $j'$, the proximate ends of which are threaded in reverse directions, and are connected by a nut or sleeve, $j^2$, threaded right and left to receive or to screw upon the threaded ends of the two sections $j$ and $j'$. By turning the sleeve or nut $j^2$ in one or the other direction the links P may be lengthened or shortened, as desired. This lengthening or shortening of the links, together with adjustment of the stems I, K, F², and G², or such of them as require adjustment, enables the operator to set the machine for operating upon a last of any form or size and in each case to secure precisely the movement necessary for the wipers.

As shown in Figs. 1, 2, and 3, each of the sectors I', K', F³, and G³ is formed or furnished with a tail or lever extension, k, of tubular form, into which is inserted one end of a rod or stem, $l$, the opposite end of which is connected with a sliding rack-bar.

As it is necessary to adjust the sectors and racks independently, each rack must be independently actuated—that is to say, while they move simultaneously and receive motion from the same source, they are not directly connected one with another.

To produce the necessary movements of the sectors and their rack-bars, we provide four actuating rack-bars, Q, Q', Q², and Q³, each of which is formed with a lug, $m$, having a slot, $m'$, through which passes a bolt, $m^2$, forming a pivotal connection between the rack-bar and one of the rods $l$, which extend into and slide longitudinally within the lever extensions $k$ of the respective sectors. The slots $m'$ permit the pivot-bolts $m^2$ to be adjusted to a limited extent, so that each sector and the rack which it controls may be moved or adjusted slightly without reference to others, thus enabling the operator to advance or recede any set of wipers or folders, as required by the particular form of the last.

Figure 4:
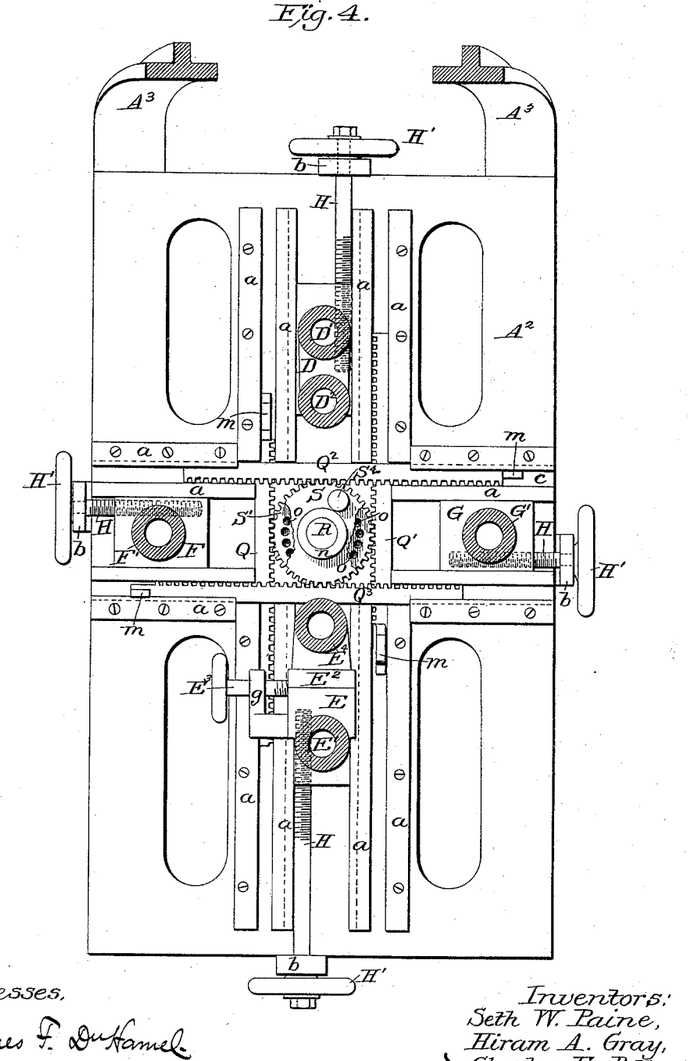
Fig. 4, an inner face view of the vertical plate or bed upon which is mounted the mechanism for turning the edges of the upper over upon the insole, showing the racks and pinions by which the side jaws and the heel and toe jaws are actuated.

The rack-bars Q Q' Q² Q³ slide between grooved ribs $a$, formed upon or secured to the upright back plate, A², of the main frame, these ribs being arranged in separated pairs, and the blocks D, E, F, and G being placed between the inner ribs of each two pairs, as plainly shown in Fig. 4. This construction is simple, cheap, and convenient.

Owing to the necessity of the racks moving in lines which cross each other, the grooves or guides for one pair of rack-bars are made deeper than or in a different vertical plane from those for the other pair, as illustrated in Figs. 1, 2, and 3, so that one pair of said rack-bars may move over or in front of the other pair.

In practice it is immaterial whether the rack-bars which actuate the side jaws be in front or in rear of those which give motion to the heel and toe wipers or folders; but it is desirable that the two rack-bars connected with the side jaws be in the same plane with each other, and that the rack-bars controlling the heel and toe wipers or folders be in a common plane by themselves, for a reason that will soon appear.

R indicates a short shaft passing through and journaled in the upright back plate, A², at or near its center, and provided at its rear end or in rear of plate A² with a pinion, R', to which rotary motion is imparted by a toothed sector, R², pivoted to the rear face of upright plate A² and furnished with a hand-lever, R³, by which it may be oscillated.

To adapt the machine to convenient manipulation by persons of different heights, the hand-lever R³ is made separate from the toothed sector R², though pivoted concentrically therewith, and is made fast to the sector by a clamping-bolt, R⁴, passing through the hand-lever and through a slot in the sector.

S and S' indicate a pinion divided in a plane at right angles to its axis, the part S being keyed or otherwise rigidly secured upon the shaft R in the plane of rack-bars Q² and Q³, and the part S' being loosely mounted upon said shaft in the plane of the rack-bars Q and Q', as illustrated in Figs. 1 and 4, in which position it is retained by the section S.

S² indicates a tubular shell screwed into or otherwise secured in a hole or socket bored through sections S of the pinion from face to face. Said case, which projects sufficiently to enable it to be readily grasped by the fingers to rotate section S of the pinion, contains a helical spring, S³, which encircles the reduced stem and bears against the shoulder of a sliding locking pin or bolt, S⁴, one end of which projects through the outer end of the shell S², and is there fitted with a knob or button by which to draw back said pin or bolt against the resistance of the spring.

The inner end of the locking pin or bolt projects beyond the rear face of pinion S and enters one or another of a series of cavities or sockets, $o$, formed in the face of pinion or section S', thereby normally locking the pinions or sections S and S' together and causing them to rotate as one with shaft R whenever the latter is turned.

As before mentioned, section S of the pinion is in the same plane as rack-bars Q and Q', and it is arranged to mesh with and give motion to said bars, as does the section S' mesh with and give motion to the rack-bars Q² and Q³.

If now it be desired to advance or recede the heel and toe jaws without moving the side jaws, as is often necessary in adjusting the machine to a different last from that previously used, it is only necessary to draw back the locking pin or bolt, turn pinion S to the right or to the left until the desired relation is established, and then permit the locking-bolt to spring into the cavity or socket $o$, with which it registers under such adjustment. This rotation of pinion S may be performed by means of shell S², but to better advantage by lever R³.

The peculiar construction of the heel, toe, and side jaws, folders, or wipers will be explained farther on, it being deemed conducive to clearness to first explain the location, construction, and operation of the pinchers, by which the stretching of the uppers is principally effected.

It is of course understood from what has already been explained that the last is supported at its forward end by the toe rest or block J², and that the heel of the last is sustained by the stem D⁴, which extends into the socket usually formed in lasts to receive the jack, and, owing to the position of these supports, the last will stand with its toe end uppermost and its sole in a practically vertical plane.

The first stretching of the upper to be performed is in the direction of the length of the last along the medial line of the vamp and instep, at the same time drawing the leather laterally or to each side of said line. For this purpose we provide two pairs of pinchers, T, Figs. 1, 2, and 3, each carried by a rack-bar, T', to which longitudinal reciprocation is imparted by means of a toothed sector, T³. Each rack-bar T' is formed with a T or dovetail rib on its back, which travels in a groove or guide of like form, made in a supporting head or block, T⁴, adjustably secured by a bolt, T⁸, to a slotted plate, T⁷, of a standard or arm, T⁵, which rises from the post D' or the block D, so that the pinchers, after adjustment of their guide-blocks, shall maintain a given relation to block D and to the parts carried thereby. The two arms T⁵ extend upward and outward from the post D' in opposite directions. The pinchers are not rigidly attached to the rack-bars T'; but one member of each pair is formed with a straight shank, $p$, which passes through a boss, $p'$, formed upon said rack-bar, and protrudes above the same, where it is encircled by a helical spring, $p^2$, and furnished with a nut, $p^3$, by which the compression of the spring may be varied as desired. The springs permit the pinchers to yield whenever the strain put upon the leather reaches a prescribed limit, and thus avoid danger of injuring the upper, even when the machine is operated by inexperienced persons. A curved and slotted yoke, $p^4$, is pivoted to the shank $p$, and extends outward over the side faces of the second member, $p^5$, of the toe-pinchers, and a pin, $p^6$, projects from said side faces of the member $p^5$ through the curved slots of the yoke $p^4$, so that if the yoke be swung upward or outward it will cause the pin $p^6$ to travel outward in said slot, throwing the rear end of said member outward, and consequently moving its jaw toward the jaw of the other member. A reverse movement of the yoke will of course separate the jaws.

For the purpose of effecting a simultaneous opening or closing of both pair of toe-pinchers, we provide a rocking shaft, U, Figs. 1 and 2, having a hand lever, U', by which to rock or turn it, and two radial arms, U², which are connected by rods U³ with the yokes $p^4$ of the toe-pinchers. By moving the lever U' in one or the other direction the pinchers will be simultaneously opened or closed. So, too, provision is made for advancing or receding the toe-pinchers simultaneously, the mechanism for this purpose being essentially the same as that for opening and closing the toe-pinchers—that is to say, we provide a rock-shaft, V, which is carried in hangers from the overarching arm A³ of the main frame, and is furnished with a hand-lever, V', and two radial arms, V², which latter are connected by rods or links V³ with the tails or lever-extensions T⁶ of the sectors T³, by which the rack-bars of the toe-pinchers are actuated. By moving the hand-lever forward or backward the pincehrs will be advanced or receded.

The pinchers by which the sides of the upper are stretched are so constructed that both jaws shall move alike in opening and closing. This construction is of importance, because the pinchers are so adjusted preparatory to being advanced to grasp the edges of the upper that the meeting line of the two jaws of each pair shall come directly in line with the edge of the upper, from which it follows that if the jaws be opened away from such line in opposite directions they will pass on opposite sides of the leather and thus insure the entrance and grasping thereof between and by them.

Under former constructions, where but one jaw has been made movable, the stationary jaw has been frequently found to strike against the upper and to push it back before the advancing pinchers or to pass to the same side thereof as the movable jaw, thus preventing the pinchers from grasping the upper or necessitating special manipulation by the operator to insure such grasping.

Figure 12:
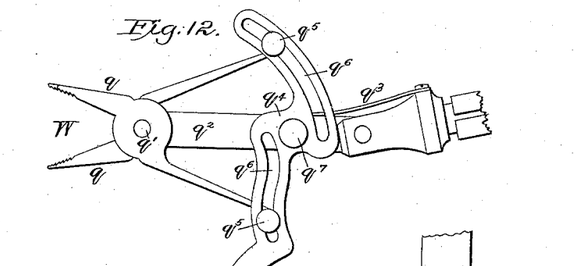

The construction of our pinchers, by which we positively actuate both jaws both in opening and in closing, will be readily understood upon referring to Figs. 1 and 3, wherein W indicates a pair of pinchers consisting of two jaw-levers, $q\ q$, which cross each other and are connected at their point of crossing by a pivot-pin, $q'$, which serves also to attach the pinchers to a stock or bar, $q^2$. This stock $q^2$ may be jointed and provided with a spring, $q^3$, as shown in Fig. 3, to permit it to yield sidewise; or, as is deemed preferable, the stock may itself be made thin enough to spring or yield to lateral strains. Pivoted upon the stock $q^2$ is a double-slotted yoke, $q^4$, having two arms or branches curved in reverse directions, as well shown in Fig. 12, and from the tail or lever extension of each member of the pinchers a pin or stud, $q^5$, passes through a slot of the yoke, as shown. The slots $q^6$ are of arc shape, but eccentric to the pivot-pin $q^7$, except for a short portion at the inner end of each, which is concentric with said pin. Owing to this peculiar form a movement of the yoke $q^4$ in one direction throws the jaws $q\ q$ apart, and a movement in the reverse direction not only brings them together, but firmly locks them together by reason of the concentric portions of the slots passing about the studs or pins $q^5$.

The initial movement in opening the jaws merely serves to swing the yoke far enough to carry the concentric portions of the slots clear of the pins or studs $q^5$, during which movement the jaws remain at rest, but after which the jaws begin at once to separate.

In practice we employ from three to six pairs of pinchers for each side of the upper, the number being entirely optional and variable at will.

It is desirable that the opening or closing of all the side pinchers be effected simultaneously and by a single movement—a result which we attain by the arrangement of parts illustrated in Figs. 1, 2, and 3. In these figures, X indicates a frame or carrier, consisting, essentially, of an upright cylindrical rod, $r$, carried at its upper and lower ends by arms $r'$, which are furnished with journals $r^2$, said journals having suitable bearings in a horizontally-swinging frame, C, which is arranged to move about the vertical post or standard $A^4$ of the main frame as a center and support. The upper journal, $r^2$, of each frame X carries a toothed sector, $r^3$, the two being arranged to mesh, as shown in Fig. 1 and by dotted lines in Fig. 3, so that each frame shall move in the same manner and time as the other. A hand-lever, $r^4$, attached to one of the frames X, serves to swing it about the axis of the journals $r^2$, and, as just mentioned, the other frame will move to correspond. Each vertical rod $r$ carries a series of collars or hubs, $r^5$, provided with a forwardly-extending neck, $r^6$, and a rearwardly-extending neck, $r^7$, both of tubular form and both internally threaded for a portion of their lengths. Within the rearwardly-extending neck $r^7$ of each collar there is placed a coiled spring, which is retained in place and compressed to the required extent by means of a screw, $r^8$, inserted behind it. The friction produced by the spring bearing upon rod $r$ prevents the collar from working up or down. From the forwardly-extending neck $r^6$ a rod, $r^9$, formed with a boss or knurl, $r^{10}$, extends to and screws into a nut or block, $r^{11}$, swiveled in the outer end of one arm of the double yoke $q^4$. The rod $r^9$ is threaded in reverse directions at opposite ends, so that by turning it in one direction it shall screw into the neck $r^6$ and into block or nut $r^{11}$ and draw the two together, or by turning it in the reverse direction it shall screw out and increase the distance between them. The adjustment of these rods will depend upon the adjustment of the pinchers, which of course will vary with different lasts; but when the adjustment is once effected all the side pinchers are opened or closed simultaneously through a single movement of the hand-lever $r^4$.

Figure 11:
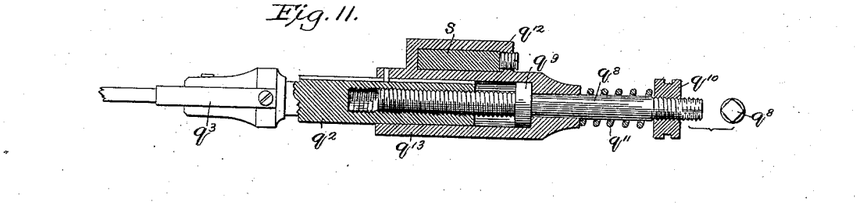

The adjustment of the pinchers, each pair independently, is provided for by the construction illustrated in Fig. 11, in which the pincher-carrying stock $q^2$ is represented as of tubular form at its rear end, internally threaded, and arranged to slide longitudinally within a sleeve, $q^{13}$. The stock is longitudinally grooved, and a pin projecting from the outer sleeve into the groove prevents the stock from turning. Screwing into the rear end of the stock is a rod, $q^8$, which is formed with a collar, $q^9$, to bear against a shoulder within the sleeve $q^{13}$, the rear end of the rod protruding through the rear end of the sleeve, as shown in Fig. 11. The extreme rear end of the rod is squared to receive a wrench or key, by which to turn it, and that portion immediately next to the squared end is threaded to receive a nut, $q^{10}$, between which and the rear end of sleeve $q^{13}$ a helical spring, $q^{11}$, is placed upon and made to encircle the rod. This spring serves to hold the collar $q^9$ normally against the internal shoulder of sleeve $q^{13}$, its compression being regulated as required by turning the nut $q^{10}$ forward or backward, and in the event of the pinchers drawing too strongly upon the upper this spring yields and relieves the upper from excessive strain. When it is desired to adjust the pinchers forward or backward—one pair independently of others—the rod $q^8$ is turned, and as it screws into or out of stock $q^2$ draws said stock in or forces it out, leaving the compression of the spring unaffected. Each sleeve $q^{13}$ is formed integral with or is rigidly secured to a slotted block, $q^{12}$, which fits upon one end of a cross-arm, $s$, carried by a slotted upright bar, Y', which forms the front of a sliding frame or sash, Y, by which all the side pinchers are advanced or receded together. Each cross-arm carries two blocks, $q^{12}$, and is formed with a central neck or shank, $s'$, which passes through the vertical slot of the upright bar Y', and also through two crossed levers, Z, of which there is a pair for each cross-arm, a vertical screw, $Z^3$, swiveled in the bar Y', screwing into the lowermost cross-arm and serving to adjust the same vertically and to hold it where adjusted. The neck or shank $s'$ is furnished in rear of the crossed levers with a nut, $s^2$, and serves as a pivot for said levers, which are also jointed at their outer ends to the corresponding ends of the next pairs above and below, as shown in Fig. 5, thus making the well-known system of levers commonly designated by the name "lazy-tongs" or "Jacob's ladder."

Figure 5:
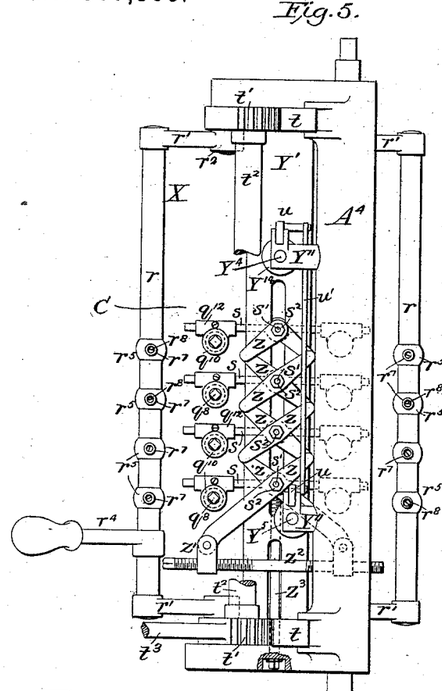
Fig. 5, a face view of the mechanism by which the pinchers are adjusted to proper relative position.

The extremities of the lower arms of the two lowermost levers, Z, have threaded blocks or nuts Z' pivotally attached to them, and a screw rod or stem, $Z^2$, threaded right and left at opposite ends, is screwed through said blocks, as shown in Fig. 5. The end of this rod or stem $Z^2$ is squared to receive a key or wrench, and by turning it in one or the other direction the ends of the levers may be drawn together or forced apart, and thus caused to raise or to lower the several cross arms $s$ and to separate them one from another. If the levers be of equal length between centers or pivots, the separation will of course be uniform; but if it be desired to vary the separation the distance between centers or pivots will be made different; or the levers may be slotted and the pivots adapted to move in the slots and to be clamped wherever desired. Such adjustment will be found unnecessary ordinarily.

Figure 13:
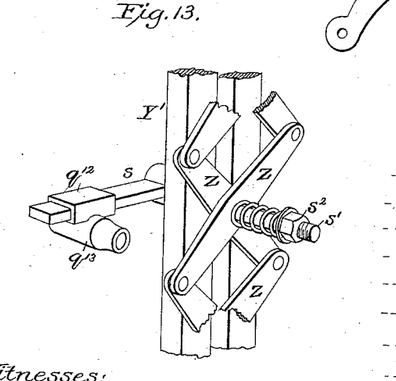

We have described the pincher-carrying stocks as being each provided with a spring; but to reduce the number of springs we propose in some cases to apply the springs to the necks or shanks $s'$ of the cross-arms $s$, in rear of the upright bar Y', and in rear also of the levers Z, as shown in Fig. 13, or they may be used in addition to the other springs. Springs thus applied to the necks $s'$ permit each cross-arm $s$ to yield independently of others, but do not permit the two pincher-stocks of any given cross-bar to yield independently of each other. For this reason it may be found desirable in some cases to use the spring-held stocks instead of applying springs to the cross-arms, or to employ both sets of springs.

The swing-frames or pincher-carriers are supported by cross-heads X' of a sliding frame or sash, $X^2$, which moves in guides in the main swinging frame C, as before mentioned, and the slotted bar of sash $Y'$, which carries the cross-arms $s$, forms the front of the sash or frame $X^2$.

The bar $Y'$ carries a sleeve, $Y^3$, forming a guide for a rod or stem, $Y^4$, which, together with a like rod, $Y^5$, serves to carry a vertical bar, $Y^6$, to which are applied the downholds $Y^7$ and $Y^8$. Both of said downholds are secured to the bar $Y^6$ by clasps $Y^9$, which may be clamped or loosened by tightening or loosening a screw, $Y^{10}$, this arrangement being adopted in order to permit of adjusting the downholds to suit different lasts. The lower rod, $Y^5$, is carried by a sleeve, $Y^3$, the same as the upper one, as shown, and both rods pass through perforations in lugs or arms $Y^{11}$, projecting from the axial upright of the swinging frame Y, as shown in Fig. 5, and are encircled in rear of said lugs by coiled springs $Y^{12}$, which bear at one end against the lugs or arms $Y^{11}$ and at the other end against heads or buttons formed upon or applied to the rear ends of the rods. The springs exert a constant backward pressure upon the rods, tending to withdraw the downholds from the face of the last, the backward movement being regulated and limited by a nut or nuts, $Y^{13}$, screwed upon the rods in advance of the slotted bar $Y'$.

$Y^{14}$ indicates a second nut screwed upon each rod in rear of bar $Y'$, and, like the nuts $Y^{13}$, they are capable of adjustment forward or backward upon said rods.

The upper and lower bars of the sash or sliding frame $X^2$ are made in the form of toothed racks $t\ t$, and receive a reciprocating motion from toothed sectors $t'$, Figs. 3, 5, carried by a vertical rock-shaft, $t^2$, journaled in the swinging frame Y, and furnished with a hand-lever, $t^3$, by which said shaft may be turned to advance or recede the rack-bars, and consequently the sash or frame, its downholds, pinchers, and pincher controlling mechanism. As the sash is advanced toward the last, the forward ends of sleeves $Y^3$, Fig. 2, coming into contact with nuts $Y^{13}$, carry the rods $Y^4\ Y^5$, and consequently the bar $Y^6$, with its downholds $Y^7$ and $Y^8$, forward in the direction of the last and against the resistance of the springs $Y^{12}$, which are consequently compressed. As the rods are thus carried forward, the nuts $Y^{14}$ in rear of bar $Y'$ ride in front of the shoulder or face of a gravitating dog, $u$, of which there is one pivoted to each of the arms or lugs $Y^{11}$, (see Figs. 2 and 5,) the two being connected by a rod or bar, $u'$, so that the two shall rise and fall in unison. The forward end of the upper dog, $u$, is beveled on its under face, as shown in Fig. 2, so that when the sash $X^2$ is moved back a certain distance a beveled projection, $u^2$, extending back from bar $Y'$, may ride beneath said forward end, lift the upper dog, and, through the connecting rod or bar $u'$, the lower dog also, clear of the nuts $Y^{14}$, whereupon the springs $Y^{12}$ will quickly retract the rods $Y^4\ Y^5$, bar $Y^6$, and the downholds carried by said bar.

It will be observed that with a given adjustment of nuts $Y^{13}$ and a given advance of the sash $X^2$ the downholds will move always to precisely the same point, and hence will press back the insole and the last upon which it is placed until the outer face of the insole comes exactly to a prescribed plane or position, the result being attained every time with certainty and expedition. This is permitted by the yielding of the toe and heel supports of the last, due to the construction before set forth, and the advance of the sash being limited by the nuts $Y^{14}$. The importance of thus bringing the outer face of the insole to precisely the same level or plane every time will be apparent when it is remembered that the folders or wipers by which the upper is laid over and upon the insole move in the same plane or planes continually under a given adjustment, and that, owing to variations in the thickness of the insole, the form or size of the last, and like considerations, the folders or wipers would, but for this provision, in some cases pass entirely clear of the insole, and in other cases come into contact with the edges thereof or with the sides of the last instead of passing over, but bearing closely upon the insole, as is necessary to good work.

It is important that when the side pinchers are being advanced to grasp the upper, and during the initial stretching, or until the strain becomes sufficient to prevent the frame Y from swinging about its pivot, some provision be made for holding said frame against such movement until the sash is retracted, and then to release or unlock it. We accordingly form a vertical slot or groove, $v$, in the lower end of the axial bar $A^4$ of frame Y, and seat in the upper face of horizontal arm or bed $A'$ of the main frame a locking bolt or slide, $v'$, which is urged upward by a spring, $v^2$. Whenever the slot or groove $v$ and the slide $v'$ come into alignment, the spring throws the bolt into said slot unless it be held down in some way.

When the sash is advanced, the locking-slide is free to thus rise and lock frame Y; but as said frame is drawn back a curved foot-piece, $v^3$, carried by said sash, rides over the top of locking bolt or slide $v'$ and depresses it, thereby releasing frame Y and leaving it free to be swung about its axis, which, however, is not done until the pinchers are detached from the upper. As the frame Y begins to swing laterally, the slot or groove $v$ passes out of alignment with the locking-bolt, which, extending slightly beneath the end or shoulder of upright $A^4$, cannot rise until the frame is again swung back.

Figure 6:
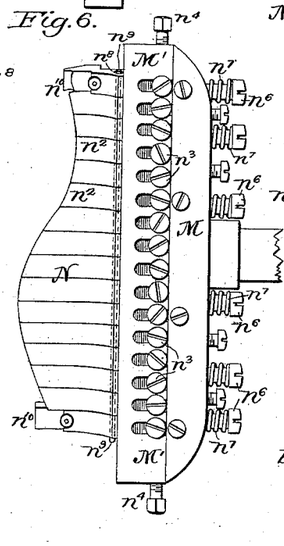
Figs. 6 and 7, views illustrating the construction of the side jaws and their wipers or folders.
Figure 7:
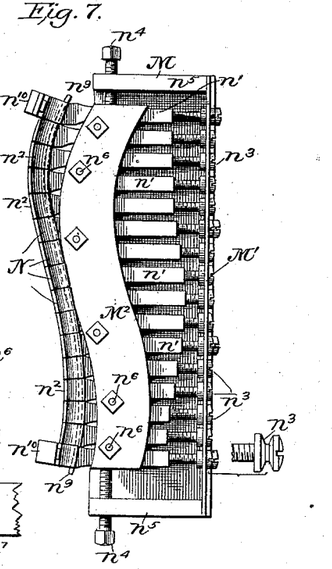
Figure 8:
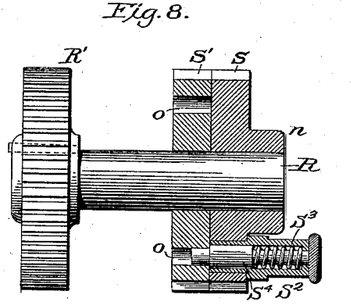
Fig. 8, a sectional view of the divided pinion which gives motion to the wipers or folders.
Figure 9:
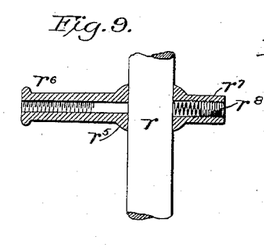
Figs. 9 to 14, inclusive, detail views of parts hereinafter referred to and explained.

It remains yet to describe in detail the construction of the wipers or folders, the general appearance of which may be seen upon referring to Figs. 1 and 2, the side jaws and their wipers or folders being better shown, however, in Figs. 6 and 7. Referring to said Figs.

6 and 7, M indicates one of the side jaws, and N the wipers or folders carried by said jaw. Each wiper or folder is formed with a rectangular shank, $n'$, terminating at one end in a laterally-extending blade, $n^2$, which is made sufficiently thin to spring slightly at its outer end, so as to adapt itself to the surface upon which it bears. The other end of the shank $n'$ is tapped to receive an adjusting-screw, $n^3$, swiveled in a plate, M′, which plate is slotted, as shown in Fig. 6, to permit the heads of the adjusting-screws to move back and forth, said Fig. 6 being a bottom view of the side jaw. By turning the screws $n^3$ the wipers may be independently adjusted to produce any desired line or curve of the outer or front faces of the blades $n^2$. The sides of the blades and the upper ends of their shanks lie in close contact, and thus the wipers serve to support one another, the close contact being maintained by set-screws $n^4$, passing through flanges $n^5$ of the head or jaw M and bearing against the sides of the outermost shank at each end of the series. By loosening either of these screws and tightening the other we are enabled to bring the shanks up into proper position if in any manner they be thrown therefrom; or, by loosening one or both of said screws the shanks are permitted to move lengthwise under the action of the adjusting-screws—a movement prevented or rendered difficult by the pressure of the set-screws $n^4$, which thus serve to prevent accidental variation of adjustment. The swiveling of the screws $n^3$ in the plate M′ must be sufficiently free to admit of a limited rocking or tipping of the blade end of each shank independently of others, in order to secure a free adjustment of the wipers in action, this result being attained by making the circumferential grooves of the screw-heads V-shaped, as in the detached view in Fig. 7.

To further provide for limited, independent, and automatic adjustment of the wipers in action, they are held in place in the head or jaw M by means of a thin and elastic retaining-plate, $M^2$, of steel or other suitable material, which plate is held against the inner faces of the shanks $n'$ by bolts $n^6$, passing through said plate and through the body of head or jaw M, said bolts being encircled between their heads and the outer face of the jaw or head by helical springs $n^7$, which hold the plate $M^2$ against the shanks with a yielding or elastic pressure.

In the actual operation of the machine, after proper initial adjustment, there is seldom, if ever, any occasion for one wiper to yield wholly independent of others; but the yielding will usually extend to several adjoining wiper-blades, thereby varying the curve formed by their outer faces, but making no abrupt angle or shoulder in the line. To further insure this result, the shanks $n'$ are each provided with a transverse hole or perforation, $n^8$, and a wire or rod, $n^9$, of steel or other highly flexible metal, is passed through the series of shanks, as indicated in Figs. 6 and 7. The end blades of the series in each jaw are each formed with a lug, $n^{10}$, cut away on the inner or under face to permit the entrance or the passage beneath them of the heel and toe wipers or folding blades $I^3$ $K^3$, which, with the closely-abutting side wipers or blades, constitute a continuous or unbroken line about the last, as will be observed upon referring to Fig. 1. In two of the patents before referred to a continuous line was formed about the last by the heel, toe, and side wipers; but in neither were independent folding blades or fingers employed at the sides. This combination forms an important feature of our present invention, because by the use of the independent blades we secure a perfect adaptation of the side wiper as a whole to the last, and to the sole and upper thereof a thorough contact and pressure with and upon the upper at all points and a continuous pressing or folding surface, which precludes the formation of the wrinkles or folds such as would occur were there open spaces or intervals between the wiper blades.

Figure 14:
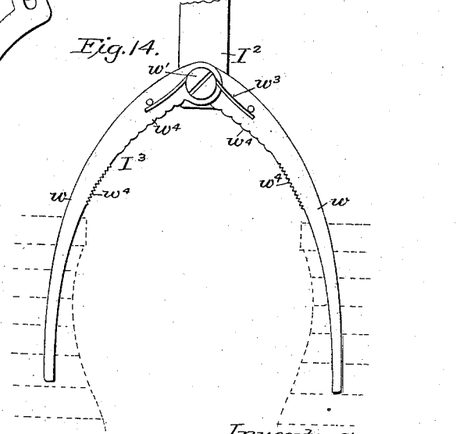

The heel and toe wipers are alike in construction, though they may vary in outline and in size or proportions. A description of one will therefore apply to both. They are best shown in Figs. 1 and 14. Each of said wipers consists of two thin flat jaws or blades, $w$, advisably of steel, the inner ends of which are overlapped and connected with each other by a pivot pin or screw, $w'$, which, passing into a rolling cylinder or sphere, $w^2$, socketed in the forward end of the toothed rack-bar $I^2$ or $K^2$, permits the wiper as a whole to move in any direction, and at the same time allows the jaws to move relatively to each other. A spring, $w^3$, conveniently formed of light wire, serves to press the jaws or blades $w$ apart, their separation being limited by the overhanging guide-lugs $n^{10}$.

The outer edges of the blades or jaws $w$ may be curved or straight and may bear any desired relation to their inner edges, the variation of their contour causing a corresponding variation in their movement toward or from each other. These blades or jaws are closed, primarily, by the approach of the side jaws toward each other and the pressure of the guide-lugs $n^{10}$ against the outer edges of said blades or jaws; but it is obvious that if the jaws be made of increasing width toward their pivots, the increase being upon the outer edges, their approach will be more rapid than if no such increase be made. Hence by varying the contour of the outer edges we can make the jaws close more quickly or slowly with a regular rate of motion, or with a series of steps or movements, as may be found expedient. In the drawings we have shown the outer edge in the form of a regular curve and the jaws of increasing width toward their pivot, which is the preferred form.

The inner edges of the jaws $w$ and their under faces are provided with serrations $w^4$, which may be along the whole length or edge, or a portion only of said length. They may be in a single group or a series of groups, their purpose being to gather the leather and prevent slipping.

The machine being constructed as above set forth, its operation may be briefly and generally stated as follows: The last, with the upper upon it, is applied to the heel and toe rests, the downholds are advanced to bear upon the last, the toe-pinchers are opened, advanced, closed upon the edge of the upper, and receded to stretch the leather lengthwise of the last and obliquely thereto, drawing the leather to shape about the heel and stretching the upper. This accomplished, the side pinchers are similarly opened, advanced, closed upon the edges of the upper, and retracted, thereby stretching the upper over the top and sides of the last. When the stretching is thus effected, the hand-lever $R^3$ is moved, causing the four racks $Q$ $Q'$ $Q^2$ $Q^3$ to move forward, thereby actuating the toothed sectors with which they are connected, advancing the racks actuated thereby, and thus advancing simultaneously both side jaws with their wipers or folders and the heel and toe wipers or folders. In thus advancing the wipers or folders come into contact with the upper just in advance of the insole, and, pressing it forward or inward over said sole, overcome the tension of the springs of the pincher-stocks and lay the upper down upon the insole, the pinchers being opened and the upper released from their grasp as soon as the wipers secure sufficient hold upon the upper to prevent its receding or escaping from between them and the insole. The heel and toe wipers are advisably set to strike the upper slightly in advance of the side jaws, and the latter preferably formed to bear first at the shank of the shoe or last. The upper and insole are coated with cement before the folders or wipers begin their action, and as soon as the upper is laid upon the insole they firmly adhere to each other, and there is no danger of their afterward coming loose. The side pinchers after being receded are carried out of the way by swinging frame Y horizontally about post or standard $A^4$, thus leaving the space in front of the last clear and unobstructed, so that the attendant may readily get at the last for any purpose. In making "turn work"—that is, work which is lasted with the inner face or lining outward and which requires to be subsequently turned—this facility of access to the last is very important, and by swinging the frame to one side instead of sliding it directly backward, as in former machines, we greatly lessen the working-space required and reduce the size, weight, and complication of the machine, while rendering the manipulation easier and more rapid.

It will be seen that the rack-bars $Q$, $Q'$, $Q^2$, and $Q^3$ may be placed in a plane different from the others, and that the pinions S S' may be made in a corresponding number of sections, so that each rack-bar may be adjusted independently of any other of the rack-bars. In practice, however, we find it sufficient to make them adjustable in pairs, and prefer that arrangement on account of its simplicity and cheapness.

We are aware that lasting-machine jaws or folders have been provided at intervals with notches to permit tacks to be driven through the upper at or back of the edge line of such jaws or folders, and this we do not claim. The serrations with which our heel and toe wipers or blades are furnished are arranged close together in a series or group, producing a wave-like line or edge, which greatly facilitates the action of the wipers or blades and causes the fullness of the leather to be evenly distributed instead of being confined to a single point or to a few points.

Having thus described our invention, what we claim is—

1. In a lasting-machine, the combination of a last, heel, toe, and side folding-blades or wipers, independent rack-bars each connected with the blades or wipers for one end or side of the last, and a pinion meshing directly with each and all of said rack-bars and serving to move them simultaneously and equally.

2. In combination with a last, heel, toe, and side folding-blades or wipers, toothed rack-bars for advancing and receding said blades or wipers, a pinion meshing with the several racks, a shaft carrying said pinion and provided with a second independent pinion, a pivoted sector meshing with said second pinion, and a hand-lever adjustably secured to the sector, whereby it may be set to suit different operators.

3. In a lasting-machine, the combination, with plate $A^2$, having ribs $a$, of rack-bars $Q$, $Q'$, $Q^2$, and $Q^3$, mounted in or between said ribs and adapted to move longitudinally, the bars $Q^2$ and $Q^3$ being placed in a different plane from bars $Q$ $Q'$, and thus adapted to move across the same, heel, toe, and side folding-blades or wipers actuated by said rack-bars, and a last to support the work while being operated upon by the blades or wipers.

4. In a lasting-machine, the combination, with a last and supports therefor, of side, heel, and toe wipers or folding-blades, independent rack-bars for actuating the wipers or blades, the rack-bars being in different planes, and a pinion divided at right angles to its axis into parts or sections corresponding to the planes of the rack-bars and capable of rotation one independently of another, whereby movement or adjustment of the bar or bars meshing with a given section, and consequently of the wipers or folders actuated thereby, is permitted.

5. In a lasting-machine, the combination, with rack-bars, as $Q$ and $Q^2$, placed in different planes, of an actuating-pinion therefor composed of sections S' S, meshing, respectively, with said bars, and a locking pin or device, substantially such as shown, whereby the sections of the pinion may be locked together or disconnected at will.

6. In combination with last-supports and a last, side, heel, and toe wipers or folders movable toward and from said last, toothed rack-bars carrying said wipers or folders, toothed sectors meshing with and serving to actuate said bars, a second set of toothed rack-bars, a pinion meshing with the several bars of the second series, and telescopic rods connecting the racks of the second series and the toothed sectors, whereby a rotation of the pinion is caused to move the two series of racks and to advance or recede the wipers.

7. In combination with a last and its support, a folder or wiper, a rack-bar carrying said folder or wiper, a toothed sector meshing with said rack-bar and serving to advance and recede the same, and a cap or guard pivoted concentrically with the sector and extending over the outer face of the rack-bar, whereby it is adapted to hold the rack and sector in engagement and yet to permit a rocking or tipping motion of the rack.

8. In combination with side jaws provided with wipers or folding-blades, end wipers or blades extending beneath guides carried by the side jaws, a bar carrying the end wipers, and a joint connecting the end wipers with their carrying-bar, constructed substantially as described and shown, whereby the end wipers are enabled to accommodate themselves to the varying positions of the side jaws.

9. In a lasting-machine, the combination, with a work-holder, of a longitudinally-movable bar, wipers or folding-blades $w$, pivotally attached to said bar and of varying width between their pivoted and free ends, and guides or supports against which the outer faces of the blades bear as the bar moves forward or backward, whereby the blades are caused to approach each other at a variable rate as different portions of their edges come into contact with the guides or supports.

10. In a lasting-machine, folding-blades or wipers having their inner edges formed with closely adjoining notches or serrations, substantially as described and shown, whereby they are adapted to gather the leather of the upper and to distribute the fullness evenly.

11. In combination with a last, folding-blades or wipers movable inward over the face of the last and provided on their inner edges and their lower faces with serrations, whereby they are adapted to take firm hold upon the upper and to fold it over upon the last or upon an insole thereon.

12. The combination, in a lasting-machine, of side jaws provided with folding-blades or wipers and with guides, as $n^{10}$, heel and toe wipers or folding-blades $w$, extending into said guides and having their outer edges made of cam shape or out of parallel with their inner edges, and reciprocating bars carrying the heel, toe, and side wipers or folders, whereby the closing together of the side jaws and the approach of the heel and toe jaws are caused to act conjointly to close the end wipers together.

13. In a lasting-machine, the combination, with guides, as $n^{10}$, of folding-blades or wipers $w$, and a spring acting upon said blades and tending to spread them apart.

14. In combination with a work-support and a wiper or folder movable to and from the same, a bar carrying said wiper or folder, a sector serving to support and move said bar, and a link pivoted at one end to a fixed support and at its other end to the bar, whereby the wiper is sustained and caused to move in a prescribed path.

15. In combination with a work support or last, a wiper or folder movable toward and from the same, a bar carrying said folder, and a link, P, pivoted at one end to a fixed support and at the other end to the wiper-carrying bar, said link being made in two parts capable of adjustment one toward or from the other, whereby the link may be shortened or lengthened and the plane or line of travel of the bar and wiper varied.

16. In a lasting-machine, in combination with a rack-bar, a sector serving to support and reciprocate the same, a link pivoted at one end to a fixed support, a bolt pivotally connected at the other end of said link and having a shifting connection with the rack-bar, and a spring interposed between the shoulder of the bolt and the rack-bar, whereby the latter is permitted to yield independently of the link.

17. In a lasting-machine, in combination with a rack-bar and a sector serving to support and reciprocate the same, a link having one end pivoted to a fixed support and the other end attached to the rack-bar by a yielding connection.

18. In a lasting-machine, the combination of a supporting-frame provided with guides, blocks mounted and movable in said guides, a supplemental block mounted upon one of said main blocks and movable transversely across the same, and posts provided, respectively, with heel and toe supports for a last, one of said posts being carried by one of the main blocks and the other by the supplemental block mounted upon the other main block.

19. In a lasting-machine, the combination, with a stationary bed or frame, a last, and folders or stretchers movable toward and from said last, of a last-support movable transversely to the length of the last, a block carrying said support, and an adjusting-screw for moving said support, whereby the last maybe brought into proper relation to the folders or stretchers.

20. In a lasting-machine, the combination of a last, folding or stretching devices movable toward and from the last, a downhold to bear upon the last or upon the insole carried thereby, and a yielding support for the last, consisting of a tubular post, a spring placed within said post, a rod or stem movable within said post and bearing at its inner end upon the spring, and a stop-pin or screw to limit the longitudinal movement of the rod or stem.

21. In a lasting-machine, the combination of a downhold and a last-support consisting of a post, a two-part rod or stem movable longitudinally in said post and one part longitudinally movable in relation to the other, a spring bearing against the inner end of the two-part stem, and a stop-pin or screw serving to limit the movement of the two-part stem.

22. In a lasting-machine, a last-support consisting of a tubular post, an internally-threaded sleeve movable within said support, a stop to limit the movement of said sleeve, a spring bearing against the inner end of the sleeve and tending to force the same outward, and a threaded stem screwed into the sleeve, substantially as described and shown, whereby the threaded stem may be screwed in or out to vary its projection without affecting the compression of the spring or the play of the sleeve.

23. In combination with a last and supports therefor adapted to hold the last with its sole in a vertical plane, a frame provided with stretching devices to act upon an upper carried by the last, said frame being arranged to swing in a horizontal plane into and out of alignment with the last.

24. In a lasting-machine, the combination of a last, a frame adapted to swing laterally in reference thereto, and a sash or sliding frame movable within the swinging frame and carrying pinchers or stretching devices to act upon an upper carried by the last.

25. In combination with a last or work support, a laterally-swinging frame in front thereof, a sash or frame mounted in said swinging frame and movable toward and from the last, a catch or locking bolt adapted to lock the swinging frame against lateral movement, and a toe or trip carried by the sliding sash and serving to force back the catch and unlock the swinging frame when the sash moves back to a prescribed point.

26. In a lasting-machine, the combination of a stem or stock, $q^2$, two lever-jaws, $q\ q$, independently pivoted thereto and each provided with a stud or pin, $q^5$, and double yoke or lever $q^4$, pivoted to stock $q^2$ and provided with slots $q^6$, the pins $q^5$ being extended into said slots.

27. In combination with a stock or stem and jaws independently pivoted thereto and provided with studs or pins, a yoke or lever pivoted to the stock and having slots on opposite sides of the pivot, the slots being concentric at their inner ends with the pivot of the lever or yoke and eccentric thereto elsewhere in their length, and the pins of the lever-jaws being extended into said slots, substantially as set forth.

28. In combination with a supporting block or sleeve, an internally-threaded pinchers-stock free to slide but held against rotation therein, a threaded stem passing through the rear end of the block or sleeve, screwed into the rear end of the pinchers-stock, and having a shoulder or enlargement bearing against a shoulder therein, a spring encircling the stem in rear of the sleeve or block, and a nut screwed upon the rod in rear of the spring.

29. In combination with sleeve $q^{13}$, a stock, $q^2$, arranged to slide longitudinally therein, shouldered rod $q^8$, extending through the sleeve, screwing into the stock $q^2$, and projecting through the rear end of the sleeve, spring $q^{11}$, encircling said rod, and nut $f^{10}$, applied to the rear end of the rod and adjustable thereon.

30. The combination, in a lasting-machine, of a series of pinchers provided with yokes or levers for opening and closing them, a bar or frame movable toward and from said pinchers, and connecting-rods extending from said bar or frame to the yokes or levers, whereby all the pinchers may be opened or closed in unison by a single movement of the bar or frame.

31. In a lasting-machine, the combination, with two groups of pinchers arranged at opposite sides of the last, each pincher being furnished with a yoke or lever for opening and closing its jaws, two swinging frames connected by toothed sectors or gearing and adapted to move in unison toward or from an intermediate point, and rods extending from each yoke or lever to the swinging frame at its side, whereby all the pinchers are simultaneously opened or closed by the application of force to one of said frames.

32. In combination with pinchers, as W, provided with yoke or lever $q^4$, rod or bar $r$, movable toward and from said pinchers, sleeve $r^5$, encircling said rod, a spring carried by the collar and bearing upon the rod, and a link or rod extending from collar $r^5$ to the lever $q^4$, the spring serving to hold the collar at any desired adjustment upon rod $r$.

33. In combination with pinchers W and their yoke or lever $q^4$, swinging frame X, provided with collar $r^5$, and rod $r^9$, extending from a pivoted block carried by the yoke or lever to the collar and adapted to be screwed into or out of either or both to shorten or lengthen the distance between the two.

34. In combination with a last or work support, a sliding sash or frame in front thereof, pinchers carried by said frame, a downhold-carrier mounted in said sash or frame and capable of motion toward and from the last independently of the sash, and a locking dog or catch adapted to engage with the downhold-carrier when it is advanced to bear upon the last or insole and to hold it against recession with the sash.

35. In combination with a last or work support, a sliding sash in front thereof provided with a series of pinchers and movable toward and from the last, a downhold-carrier mounted and arranged to slide a limited distance in and independently of the sash, adjustable stops to limit the independent movement of the downhold-carrier, and a dog or catch to hold said carrier in its forward position while the pinchers are receded.

36. In combination with a last or work support, sliding sash $X^2$, provided with toothed rack-bars, toothed sectors meshing with said bars and serving to advance and recede the sash, rods $Y^4$ and $Y^5$, carrying a downhold-bar and movable back and forth in the sash, nuts $Y^{13}$ and $Y^{14}$, applied to said rods and serving to control their movements forward and backward, springs $Y^{12}$, applied to said rods and tending to recede the downhold-bar, and locking-dogs $u$, adapted to engage the nuts $Y^{14}$ when the downhold is advanced and to hold the same forward against the force of the springs.

37. In combination with sliding sash $X^2$, provided with finger $u^2$, downhold-bar $Y^6$, and its carrying-rods $Y^4 Y^5$, movable within or relatively to said sash and provided with retracting-springs, pivoted dog $u$, adapted to engage against a nut or shoulder upon one of said rods, the finger $u^2$ and dog $u$ being arranged to ride one beneath the other, substantially as explained, whereby the dog is automatically lifted and the springs permitted to retract the downhold when the sash is moved back a given distance.

38. In combination with a last or work support, a guide-bar in front thereof, a series of cross-arms movable in said guide-bar, pinchers carried by said cross-arms, a system of crossed levers connected at their points of crossing with the cross-arms and at their ends with each other, and a screw or equivalent device for drawing the free ends of one pair of levers together or moving them apart, whereby the entire series of levers may be caused to move in unison and to move the cross-arms and their pinchers toward or from each other.

39. In combination with slotted bar $Y'$ and cross arms $s$, carrying pinchers, crossed levers Z, connected at their points of crossing with the shanks of the cross-arms $s$ and pivotally connected at their ends, and screw rod or stem $Z^2$, extending from one lever to another and serving to draw them together or force them apart.

40. In a lasting-machine, a side jaw comprising a head, M, a slotted plate, $M'$, a series of wipers or folders, N, each consisting of a shank, $n'$, and a blade, $n^2$, adjusting-screws $n^3$, swiveled in the slots of plate $M'$ and screwing into the shanks of the wipers, a yielding plate, $M^2$, overlying the shanks of the wipers, and screws $n^4$, bearing against the shanks of the outer wipers of the series.

41. In a lasting-machine, a side jaw having a series of independently-adjustable wiper blades or folders, and a flexible rod or wire passing through the shanks of the several wipers or folders, substantially as and for the purpose specified.

42. In combination with head M and slotted plate $M'$, wipers or folding-blades N, resting with their backs against the face of head M, adjusting-screws $n^3$, swiveled in plate M and screwing into the shanks of the wipers or folders, plate $M^2$, extending over the front faces of the blade or wiper-shanks, bolts $n^6$, passing through said plate and the head M, and springs encircling the bolts and tending to hold the plate $M^2$ against the shanks of the wipers.

43. In a lasting-machine, the combination of a toothed rack carrying a wiper or folder, a toothed sector meshing with and serving to actuate said rack, a second rack for imparting motion to said sector, provided with a slotted lug, as $m$, and a bolt passing through said slot and into the lever-arm of the sector, whereby the sector and the rack which it operates may be adjusted without moving the actuating-rack.

44. In a lasting-machine, the combination of a last, heel and toe jaws or wipers, and side jaws or wipers, the side wipers being made up of independently-yielding blades or sections in immediate contact with each other, and the heel and toe jaws being extended across the side wipers, whereby an unbroken but yielding line of folders or wipers is formed entirely around the last.

SETH WHITE PAINE.
HIRAM A. GRAY.
CHARLES E. PETTEE.

Witnesses to the signatures of S. W. Paine and C. E. Pettee:
THOS. RICHARDSON,
A. D. RICHARDSON.

Witnesses to the signature of H. A. Gray:
GEO. D. SEYMOUR,
H. M. GOODHUE.